US012736365B2

(12) United States Patent
Sugai et al.

(10) Patent No.: US 12,736,365 B2
(45) Date of Patent: Sep. 15, 2026

(54) INFORMATION OUTPUT DEVICE, INFORMATION OUTPUT METHOD, AND RECORDING MEDIUM

(71) Applicant: NEC Corporation, Tokyo (JP)

(72) Inventors: Kohei Sugai, Tokyo (JP); Takashi Kuribara, Tokyo (JP); Masato Kita, Tokyo (JP); Ryosuke Kumagai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 102 days.

(21) Appl. No.: 18/728,197

(22) PCT Filed: Mar. 18, 2022

(86) PCT No.: PCT/JP2022/012666
§ 371 (c)(1),
(2) Date: Jul. 11, 2024

(87) PCT Pub. No.: WO2023/175918
PCT Pub. Date: Sep. 21, 2023

(65) Prior Publication Data
US 2025/0060227 A1 Feb. 20, 2025

(51) Int. Cl.
*G01C 21/00* (2006.01)
*G01C 21/20* (2006.01)
*G01P 13/00* (2006.01)

(52) U.S. Cl.
CPC ......... *G01C 21/3807* (2020.08); *G01C 21/20* (2013.01); *G01P 13/00* (2013.01)

(58) Field of Classification Search
None
See application file for complete search history.

(56) References Cited

U.S. PATENT DOCUMENTS

2016/0323920 A1* 11/2016 Carbajal ........... H04W 72/0453
2021/0239785 A1* 8/2021 Suzaki .................. G01S 5/0218

FOREIGN PATENT DOCUMENTS

CN 107531324 B * 2/2021 ............... G08G 5/26
CN 113906793 A * 1/2022 ............ H04W 64/00

(Continued)

OTHER PUBLICATIONS

International Search Report for PCT Application No. PCT/JP2022/012666, mailed on Jun. 14, 2022.

(Continued)

*Primary Examiner* — Rufus C Point

(57) ABSTRACT

An information output device includes: information reception means for receiving radio wave information about a radio wave present in surroundings being received by radio wave reception means for receiving the radio wave; estimation means for estimating, based on the radio wave information, a movement direction of wireless communication means for performing wireless communication in which an influence of radio wave interference on the wireless communication is reduced; and output means for outputting movement information being information indicating the movement direction, wherein the output means outputs the movement information to display means for displaying an image, the movement information is image information for displaying the image on the display means, and the image is an image in which the movement direction of the wireless communication means is displayed on a map.

18 Claims, 12 Drawing Sheets

(56) References Cited

FOREIGN PATENT DOCUMENTS

| | | | |
|---|---|---|---|
| JP | 2016-111431 | A | 6/2016 |
| JP | 2018-165099 | A | 10/2018 |
| WO | 2009/008306 | A1 | 1/2009 |
| WO | 2012/101680 | A1 | 8/2012 |
| WO | 2019/194005 | A1 | 10/2019 |
| WO | 2020/213128 | A1 | 10/2020 |

OTHER PUBLICATIONS

English translation of Written opinion for PCT Application No. PCT/JP2022/012666, mailed on Jun. 14, 2022.
JP Office Action for JP Application No. 2024-507420, mailed on Oct. 14, 2025 with English Translation.

* cited by examiner

90
INFORMATION PROCESSING DEVICE
91
COMMUNICATION INTERFACE
92
INPUT/OUTPUT INTERFACE
93
ARITHMETIC DEVICE
94
STORAGE DEVICE
95
NON-VOLATILE STORAGE DEVICE
96
DRIVE DEVICE
97
RECORDING MEDIUM

INFORMATION OUTPUT DEVICE, INFORMATION OUTPUT METHOD, AND RECORDING MEDIUM

This application is a National Stage Entry of PCT/JP2022/012666 filed on Mar. 18, 2022, the contents of all of which are incorporated herein by reference, in their entirety.

TECHNICAL FIELD

The present invention relates to an information output device and the like.

BACKGROUND ART

In wireless communication, one of factors of a decrease in throughput is radio wave interference.

When radio wave interference occurs and throughput decreases, there is a possibility that quality of a service provided by wireless communication decreases. The decrease in service quality is, for example, disturbance of a reproduced video and sound, deterioration in control accuracy of remote control, and the like.

Thus, when radio wave interference is occurring, it is desirable to take action for radio wave interference and solve radio wave interference.

However, the factor of a decrease in throughput may also be anything other than radio wave interference. Thus, in order to take action for radio wave interference, first, it is necessary to investigate whether radio wave interference is occurring.

A decrease in throughput is generally detected by occurrence of a decrease in service quality. Then, in general, an investigator goes to a site where the decrease in service quality is occurring, investigates a surrounding radio wave situation and the like, and thus investigates whether radio wave interference is occurring. Then, when radio wave interference is occurring, action for radio wave interference is taken.

Further, examples of the related technology include the technologies disclosed in PTL 1.

CITATION LIST

Patent Literature

PTL 1: International Publication No. WO2019/194005

SUMMARY OF INVENTION

Technical Problem

However, a general method for investigating radio wave interference as described above requires an investigator to go to a site, and thus requires time and effort. Further, when radio wave interference is occurring, it is difficult for a user to determine what to do in order to be able to avoid an influence of radio wave interference.

An object of the present invention is, in view of the problem described above, to provide an information output device and the like that are able to output information for more easily taking action for radio wave interference.

Solution to Problem

In one aspect of the present invention, an information output device includes: an information reception means for receiving radio wave information about a radio wave present in surroundings being received by a radio wave reception means for receiving the radio wave; an estimation means for estimating, based on the radio wave information, a movement direction of a wireless communication means for performing wireless communication in which an influence of radio wave interference on the wireless communication is reduced; and an output means for outputting movement information being information indicating the movement direction, and the output means outputs the movement information to a display means for displaying an image, the movement information is image information for displaying the image on the display means, and the image is an image in which the movement direction of the wireless communication means is displayed on a map.

Further, in another aspect of the present invention, an information output method includes: receiving radio wave information about a radio wave present in surroundings being received by a radio wave reception means for receiving the radio wave; estimating, based on the radio wave information, a movement direction of a wireless communication means for performing wireless communication in which an influence of radio wave interference on the wireless communication is reduced; outputting movement information being information indicating the movement direction; and outputting the movement information to a display means for displaying an image, and the movement information is image information for displaying the image on the display means, and the image is an image in which the movement direction of the wireless communication means is displayed on a map.

Further, in another aspect of the present invention, an information output program recorded in a computer-readable recording medium causes a computer to achieve: an information reception function of receiving radio wave information about a radio wave present in surroundings being received by a radio wave reception means for receiving the radio wave; an estimation function of estimating, based on the radio wave information, a movement direction of a wireless communication means for performing wireless communication in which an influence of radio wave interference on the wireless communication is reduced; and an output function of outputting movement information being information indicating the movement direction, and the output function outputs the movement information to a display means for displaying an image, the movement information is image information for displaying the image on the display means, and the image is an image in which the movement direction of the wireless communication means is displayed on a map.

Further, in another aspect of the present invention, an information output system includes: an information reception means for receiving radio wave information about a radio wave present in surroundings being received by a radio wave reception means for receiving the radio wave; an estimation means for estimating, based on the radio wave information, a movement direction of a wireless communication means for performing wireless communication in which an influence of radio wave interference on the wireless communication is reduced; and an output means for outputting movement information being information indicating the movement direction, and the output means outputs the movement information to a display means for displaying an image, the movement information is image information for displaying the image on the display means, and the image is an image in which the movement direction of the wireless communication means is displayed on a map.

Advantageous Effects of Invention

According to the present invention, information for more easily taking action for radio wave interference is able to be output.

EXAMPLE EMBODIMENT

First Example Embodiment

A first example embodiment of the present invention is described.

Note that one specific example of an information output device 10 in the first example embodiment is an information output device 20 in a second example embodiment and an information output device 30 in a third example embodiment that are described below.

First, a configuration example of the information output device 10 in the present example embodiment is described.

Figure 1:
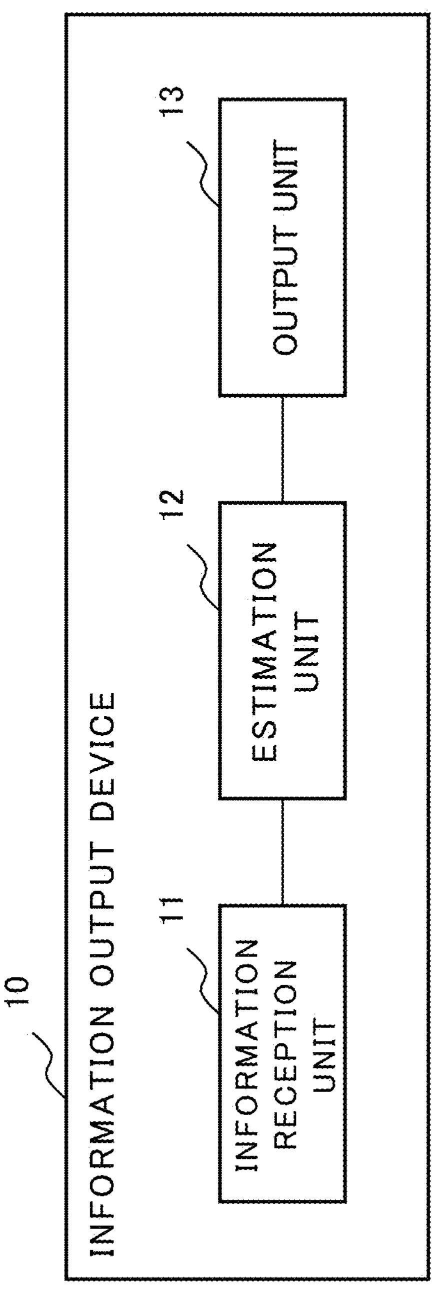
FIG. 1 is a diagram illustrating a configuration example of an information output device according to a first example embodiment of the present invention.

FIG. 1 illustrates the configuration example of the information output device 10 according to the present example embodiment. The information output device 10 includes an information reception unit 11, an estimation unit 12, and an output unit 13.

The information reception unit 11 (information reception means) receives radio wave information about a radio wave received by a radio wave reception means. The radio wave reception means receives a radio wave present in surroundings. The radio wave information is information about the radio wave. The estimation unit 12 (estimation means) estimates, based on the radio wave information, a movement direction of a wireless communication means for performing wireless communication in which an influence of radio wave interference on the wireless communication is reduced.

The output unit 13 (output means) outputs movement information. The movement information is information indicating the movement direction. The output unit 13 outputs the movement information to a display means. The display means displays an image. The movement information is image information for displaying the image on the display means. The image is an image in which the movement direction of the wireless communication means is displayed on a map.

Next, an example of an operation flow of the information output device 10 in the present example embodiment is described.

Figure 2:
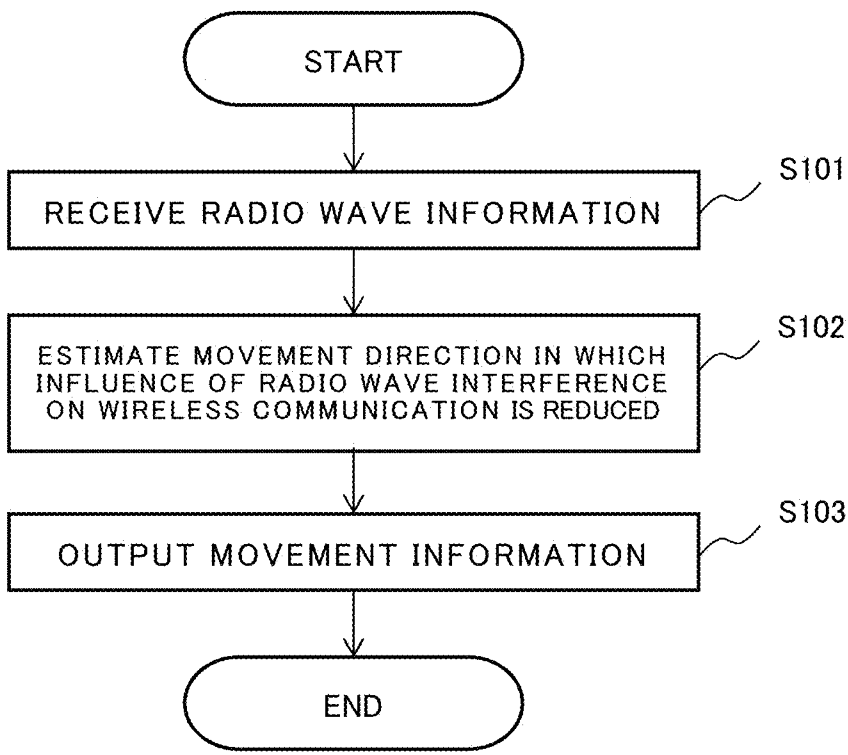
FIG. 2 is a diagram illustrating an example of an operation flow of the information output device according to the first example embodiment of the present invention.

FIG. 2 illustrates the example of the operation flow of the information output device 10 according to the present example embodiment.

The information reception unit 11 receives radio wave information (step S101). The estimation unit 12 estimates, based on the radio wave information, a movement direction of a wireless communication means for performing wireless communication in which an influence of radio wave interference on the wireless communication is reduced (step S102).

The output unit 13 outputs movement information (step S103). The movement information is information indicating the movement direction. The output unit 13 outputs the movement information to a display means.

As described above, in the first example embodiment of the present invention, the information output device 10 includes the information reception unit 11, the estimation unit 12, and the output unit 13. The information reception unit 11 receives radio wave information about a radio wave received by a radio wave reception means for receiving a radio wave present in surroundings. The estimation unit 12 estimates, based on the radio wave information, a movement direction of a wireless communication means for performing wireless communication in which an influence of radio wave interference on the wireless communication is reduced. The output unit 13 outputs movement information. The movement information is information indicating the movement direction. The output unit 13 outputs the movement information to a display means. The display means displays an image. The movement information is image information for displaying the image on the display means. The image is an image in which the movement direction of the wireless communication means is displayed on a map.

In this way, with regard to the wireless communication means for performing the wireless communication, the information output device 10 estimates, based on the radio wave information, the movement direction in which an influence of radio wave interference on the wireless communication is reduced. Then, the information output device 10 outputs the movement information indicating the movement direction to the display means. An image displayed on the display means is an image in which the movement direction of the wireless communication means is displayed on a map. In this way, a user who refers to the image can easily recognize the movement direction of a wireless communication means 40 in which an influence of radio wave interference is reduced. Then, the user can move the wireless communication means 40 in the movement direction in which an influence of radio wave interference is reduced.

Thus, information for more easily taking action for radio wave interference can be output.

Second Example Embodiment

Next, the information output device 20 in the second example embodiment of the present invention is described. Note that one specific example of the information output device 10 in the first example embodiment is the information output device 20 in the second example embodiment.

Figure 3:
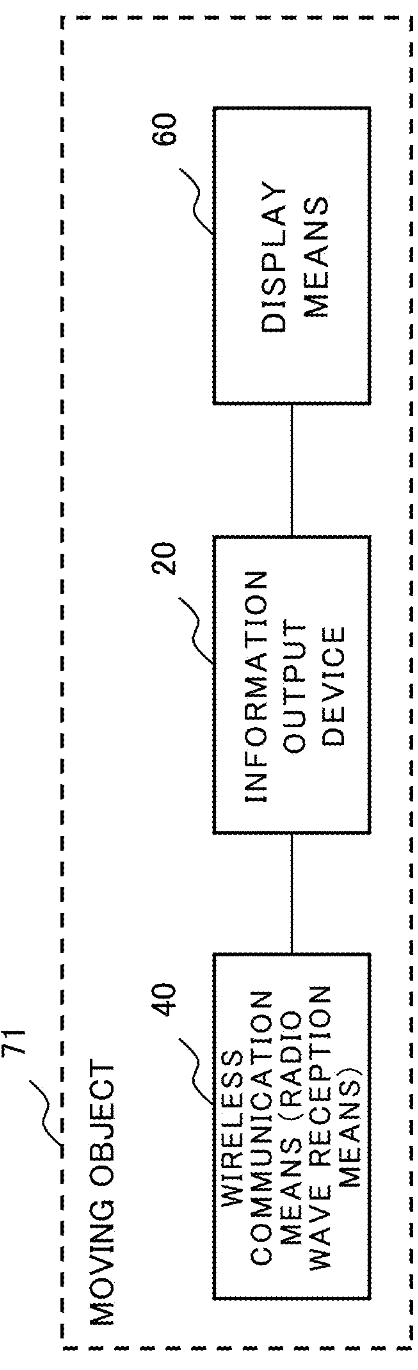
FIG. 3 is a diagram illustrating a configuration example of a system including an information output device according to a second example embodiment of the present invention.

First, FIG. 3 illustrates a configuration example of a system including the information output device 20 according to the present example embodiment. The information output device 20 is connected to a wireless communication means 40 with each other. Further, the information output device 20 is connected to a display means 60 with each other. Note that the wireless communication means 40 may be included in the information output device 20.

The information output device 20, the wireless communication means 40, and the display means 60 are included in, for example, a moving object 71. The moving object 71 is, for example, an aircraft, a ship, a cellular phone, and the like. Note that the information output device 20 and the display means 60 may not be included in the moving object 71.

The wireless communication means 40 performs wireless communication. The wireless communication means 40 can use any method of wireless communication.

The display means 60 is a man-machine interface such as a display as an output device. The display means 60 displays an image. In the present example embodiment, the information output device 20 outputs movement information to the display means 60. The display means 60 may be mounted on the moving object 71, or may be a display and the like placed at a management center that manages the moving object 71, and the like.

Figure 4:
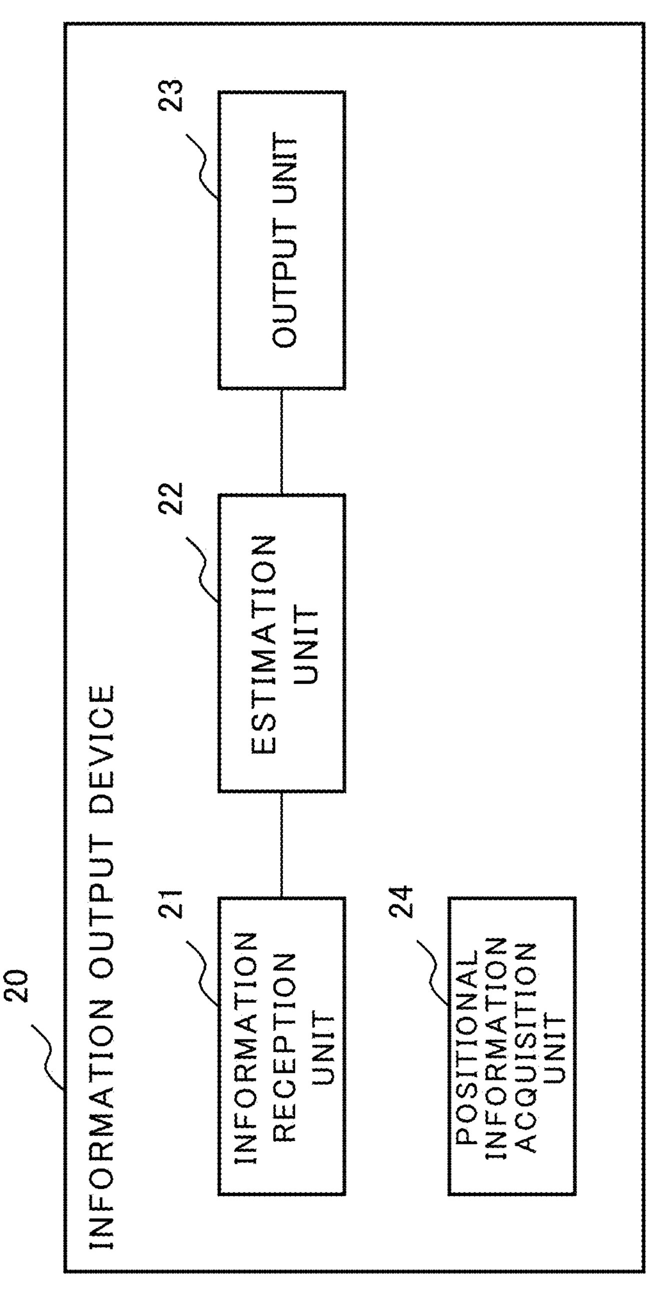
FIG. 4 is a diagram illustrating a configuration example of the information output device according to the second example embodiment of the present invention.

Next, FIG. 4 illustrates the configuration example of the information output device 20 according to the present example embodiment. The information output device 20 according to the present example embodiment includes an information reception unit 21, an estimation unit 22, an output unit 23, and a positional information acquisition unit 24.

The information reception unit 21 receives radio wave information. The radio wave information is information about a radio wave received by a radio wave reception means. In the present example embodiment, the radio wave reception means is the wireless communication means 40. In the present example embodiment, the wireless communication means 40 functions not only as the wireless communication means for performing the wireless communication but also as the radio wave reception means for receiving a radio wave present in surroundings. The information reception unit 21 receives, from the wireless communication means 40, the radio wave information about a radio wave present around the wireless communication means 40.

The positional information acquisition unit 24 acquires positional information about the moving object 71. In the present example embodiment, a position of the moving object 71 is equivalent to a position of the wireless communication means 40. Then, the information reception unit 21 stores the radio wave information received by the information reception unit 21 and the positional information acquired by the positional information acquisition unit 24 in a storage unit (not illustrated) in association with each other. Note that the positional information may be two-dimensional information such as a latitude and a longitude, or may be three-dimensional information acquired by adding an altitude to a latitude and a longitude.

The moving object 71 includes the wireless communication means 40. In a case of the present example embodiment, the information output device 20 is included in the moving object 71. Thus, the positional information acquisition unit 24 can acquire positional information about the moving object 71 by using, for example, a global navigation satellite system (GNSS) and the like.

Alternatively, the positional information acquisition unit 24 may receive positional information about the wireless communication means 40 from the wireless communication means 40. In this case, the wireless communication means 40 may have a function of acquiring the positional information about the wireless communication means 40.

The estimation unit 22 estimates a movement direction of the wireless communication means 40, based on the radio wave information. The movement direction is a direction in which an influence of radio wave interference on the wireless communication performed by the wireless communication means 40 is reduced. An estimation method of a movement direction is described below.

The output unit 23 outputs movement information. The movement information is information indicating the movement direction. The output unit 23 outputs the movement information to the display means 60. The movement information is image information for displaying an image on the display means 60. The image is an image in which the movement direction of the wireless communication means 40 is displayed on a map. The output unit 23 displays, on the display means 60, the image indicating the movement direction of the wireless communication means 40 by outputting the movement information to the display means 60.

Next, the estimation method of a movement direction is described.

First, the estimation unit 22 performs estimation of occurrence of radio wave interference, based on an estimation condition. The estimation condition is a condition satisfied when estimation of occurrence of radio wave interference is performed. Then, when the estimation unit 22 estimates that radio wave interference is occurring, the estimation unit 22 estimates a movement direction in which an influence of radio wave interference is reduced.

First, a specific example of the estimation condition is described.

For example, the estimation condition is a condition that, in the wireless communication performed by the wireless communication means 40, a reception signal level is equal to or more than a first threshold value and throughput is equal to or less than a second threshold value. The condition indicates that the signal level is sufficient, but the throughput decreases. In such a case, there is a high possibility that radio wave interference is occurring. Note that a signal to interference plus noise ratio (SINR) may be used instead of throughput for the estimation condition. In this case, the information reception unit 21 receives, from the wireless communication means 40, quality information such as a reception signal level, throughput, and an SINR about the wireless communication performed by the wireless communication means 40.

Further, the estimation condition may be a condition that a reception signal level is equal to or more than the first threshold value and a packet error rate (PER) is equal to or more than a third threshold value. A bit error rate (BER) may be used instead of a PER for the estimation condition. In this case, the information reception unit 21 receives, from the wireless communication means 40, quality information such as a reception signal level, a PER, and a BER about the wireless communication performed by the wireless communication means 40.

Further, the estimation condition may be, for example, a condition based on a date and time and a place. For example, it is assumed to be clear that radio wave interference occurs at a specific place at a specific time on a specific day of a week due to passage of an interference source. In such a case, the estimation condition may be a specific time (time period) on a specific day of a week for a specific place.

Further, the estimation condition may be generated based on a history of an estimation result of radio wave interference in the past. For example, the estimation unit 22 stores, in the storage unit, information about a date and time and a place of estimated occurrence of radio wave interference. Then, a condition generation unit (not illustrated) generates a condition of a date and time and a place of estimated occurrence of radio wave interference, based on a history of the information about the date and time and the place of the estimated occurrence of radio wave interference. The condition generation unit may be included inside the information output device 20, or may be located outside the information output device 20. Further, the condition generation unit may generate the estimation condition by, for example, machine learning.

Further, the estimation condition may be acquired by combining two or more individual estimation conditions described above. Note that, hereinafter, the individual estimation condition is referred to as an individual condition. For example, the estimation condition may be a condition that any one or more of the individual conditions are satisfied, or may be a condition that a predetermined number or more of the individual conditions are satisfied.

Next, the estimation method of a movement direction is described.

The estimation unit 22 may estimate, for example, a direction away from an interference source of radio wave interference as a movement direction. When a position of the interference source can be recognized, the estimation unit 22 may calculate the direction away from the interference source by using positional information about the interference source. For example, when information about a position of the interference source is included in radio wave information, the estimation unit 22 may use the information. Further, when a position of the interference source is managed by a management device (not illustrated), the information reception unit 21 may acquire radio wave information including positional information about the interference source from the management device.

Note that, when the estimation unit 22 estimates that radio wave interference is occurring, the estimation unit 22 can estimate, as an interference wave, a radio wave present around the wireless communication means 40. Information (radio wave information) about a radio wave present around the wireless communication means 40 is received by the information reception unit 21. The estimation unit 22 confirms the radio wave information received from the information reception unit 21. Then, the estimation unit 22 estimates, as an interference wave, a radio wave having a frequency in which radio wave interference may occur. The radio wave interference herein is radio wave interference with the wireless communication performed by the wireless communication means 40. In this case, the radio wave information includes information about the frequency of the radio wave.

Further, the estimation unit 22 may estimate a position of an interference source. The estimation unit 22 can use any method as an estimation method of a position of an interference source. The estimation unit 22 can use, for example, a radio wave emission position estimation method such as an angle of arrival (AOA) method, a power of arrival (POA) method, and a time difference of arrival (TDOA) method for estimation of a position of an interference source.

In this case, the radio wave information may include information used in the radio wave emission position estimation methods. The radio wave information may include, for example, direction information indicating an arrival direction of an interference wave. The radio wave reception means (wireless communication means 40) can estimate an arrival direction of a signal by, for example, an antenna that can control directivity by beam forming and rotation.

The radio wave information and the positional information are stored in the storage unit in association with each other. The estimation unit 22 can estimate a position of an interference source by using the information stored in the storage unit.

Further, when positional information about an interference source acquired by the interference source with a GNSS is included in the radio wave information received by the information reception unit 21, the estimation unit 22 may use the positional information.

Further, the estimation unit 22 may estimate, for example, a direction approaching a communication partner as a movement direction. The communication partner is a connection destination of the wireless communication performed by the wireless communication means 40. For example, when the wireless communication is performed via a base station, an access point, and the like, the communication partner is the base station, the access point, and the like. Further, when the wireless communication is performed between terminals without interposing a base station, an access point, and the like, the communication partner is an opposite terminal.

The estimation unit 22 can calculate a direction approaching a communication partner, based on positional information about the communication partner and positional information about the wireless communication means 40. More specifically, the estimation unit 22 can calculate a direction approaching a communication partner as follows.

When a position of the communication partner is fixed, the estimation unit 22 may acquire positional information about the communication partner from the storage unit. In this case, the storage unit is assumed to store a correspondence between identification information about the communication partner and the positional information about the communication partner. Further, in this case, the estimation unit 22 is assumed to receive the identification information about the communication partner from the wireless communication means 40. The wireless communication means 40 can acquire the identification information about the communication partner by communication with the communication partner.

Further, when the wireless communication means 40 is mounted on a ship, an aircraft, or the like, positional information about a ship or the like belonging to the same group may be exchanged by communication (for example, satellite communication and the like) different from wireless communication affected by radio wave interference. When the wireless communication means 40 and the communication partner are mounted on such a ship or the like, the estimation unit 22 may use, as the positional information about the communication partner, positional information that can be recognized by different communication.

Further, the estimation unit 22 may estimate, as a movement direction, a direction different from a direction in which an interference source is moving, for example, a direction opposite to the direction in which the interference source is moving. For example, as described above, the estimation unit 22 can estimate a position of the interference source. The estimation unit 22 stores the estimated positional information in the storage unit in association with time information and identification information about the interference source. Then, the estimation unit 22 can calculate a direction in which the interference source is moving by using the time information and the positional information about the interference source having the same identification information. Note that, in this case, identification information about a radio wave is included in radio wave information.

Further, a movement direction may be further a direction in which a possibility of interception is reduced. A target by which the wireless communication performed by the wireless communication means 40 is not desired to be intercepted is, for example, a reception device that is not a reception device of a group to which the wireless communication means 40 belongs. For example, when radio wave information about a radio wave that is not used in the group is included in radio wave information received by the information reception unit 21, the reception device being the target by which interception is not desired may be present in a position of a transmission source. Thus, the estimation unit 22 estimates, as a movement direction, a direction in which an influence of radio wave interference is reduced, and being away from the position of the transmission source of the radio wave that is not used in the group. Note that the estimation unit 22 can perform estimation of a position of a transmission source by a method similar to the estimation of a position of an interference source. Further, the estimation unit 22 determines whether a radio wave is used in the group from, for example, identification information about the radio wave, a modulation method, waveform data, and the like.

Further, the estimation unit 22 may cause the wireless communication means 40 to transmit a dummy signal. When some sort of signal is transmitted by a radio wave that is not used in the group within a predetermined time since the wireless communication means 40 has transmitted the dummy signal, there is a possibility that the wireless communication means 40 may be present in a range in which a reception device by which interception is not desired can receive the signal. Thus, in this case, the estimation unit 22 may estimate, as a movement direction, a direction in which an influence of radio wave interference is reduced, and being away from a position of a transmission source of the radio wave that is not used in the group.

Further, the estimation unit 22 may estimate a departure time in addition to a movement direction. The departure time is a time required until the moving object 71 (wireless communication means 40) departs from an interference area. The interference area is an area with a possibility that radio wave interference with the wireless communication performed by the wireless communication means 40 may occur. The interference area is, for example, an area having a signal level of an interference wave at a level at which radio wave interference with the wireless communication performed by the wireless communication means 40 may occur. More specifically, the interference area is, for example, an area where a signal level of an interference wave exceeds a reference level L. For example, when a movement direction is a direction opposite to a direction of an interference source, the estimation unit 22 can calculate a departure time as follows. Note that the following method is one example. The estimation unit 22 can calculate a departure time by any method.

A reception signal level R of an interference wave in the wireless communication means 40 can be represented as in an equation (1) by using a distance D1 between the wireless communication means 40 and the interference source, and a coefficient α.

$$R = \alpha/(D1^2) \tag{1}$$

Note that, in this case, the radio wave information includes a reception signal level of a radio wave. The estimation unit 22 can calculate the coefficient α by using the equation (1).

Further, the reference level L can be represented as in an equation (2) by using a distance D2 between the wireless communication means 40 and the interference source.

$$L = \alpha/(D2^2) \tag{2}$$

The reference level L is a reception signal level of the interference wave in the wireless communication means 40 at a boundary of an interference area. The estimation unit 22 can calculate, by using the equation (2), the distance D2 in which the reception signal level in the wireless communication means 40 is the reference level L. Note that, in the equation (2), a value acquired by performing predetermined correction and correction by a frequency on the coefficient α may be used instead of the coefficient α.

Then, the estimation unit 22 can calculate a time t until the distance D1 becomes the distance D2 by using an equation (3).

$$t = (D2 - D1)/v \tag{3}$$

Note that v in the equation (3) is a movement speed of the moving object 71. The positional information acquisition unit 24 can acquire, by using a GNSS and the like, the movement speed of the moving object 71 on which the information output device 20 is mounted.

Further, the positional information and the radio wave information are stored in the storage unit in association with each other. The radio wave information in which the reception signal level of the interference wave in the wireless communication means 40 falls below the reception level L is assumed to be stored in the storage unit. In this case, the estimation unit 22 may set, as a departure position from the interference area, a position indicated by the positional information associated with the radio wave information. Then, the estimation unit 22 may calculate a time until the moving object 71 reaches the departure position from the interference area, based on the movement speed and a current position of the moving object 71.

Next, a specific example of an image displayed on the display means 60 by the output unit 23 is described.

For example, the image may be an image in which information about a movement direction estimated by the estimation unit 22 is displayed on a map. When the estimation unit 22 estimates a position of an interference source, the image may include a screen item indicating the position of the interference source. The position of the interference source is often estimated in a range having a width to some extent instead of a pinpoint. Thus, the screen item indicating the interference source may be displayed in a size indicating a range in which the interference source is estimated to be present. Note that the map may be a two-dimensional map, or may be a map indicating a three-dimensional space including a height direction.

Further, the image may include a screen item indicating a position of a communication partner. Further, when the estimation unit 22 estimates a direction in which the interference source is moving, the image may include information indicating the direction in which the interference source is moving. Further, when the estimation unit 22 estimates a departure time, the image may include information about the departure time. Further, the image may include information about a movement speed of the moving object 71. Further, the image may include at least a part of the radio wave information such as a frequency of the interference wave and identification information about the interference source.

Figure 5:
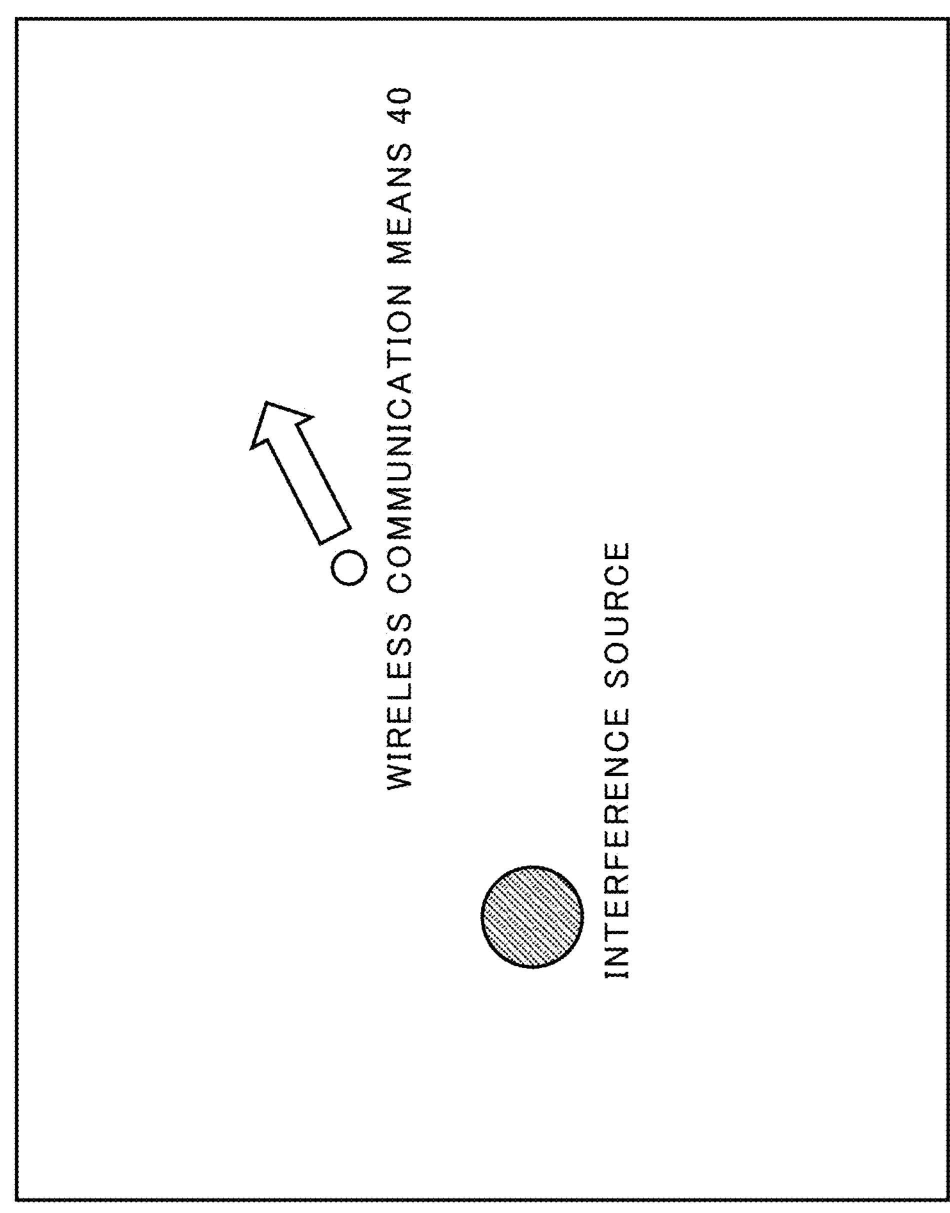
FIG. 5 is a diagram of an image displayed on a display means by the information output device according to the second example embodiment of the present invention.

FIG. 5 is a diagram illustrating an example of an image displayed on the display means. In the example in FIG. 5, a movement direction of the wireless communication means 40 is displayed on a map by an arrow. Further, a screen item indicating an interference source is displayed.

Figure 6:
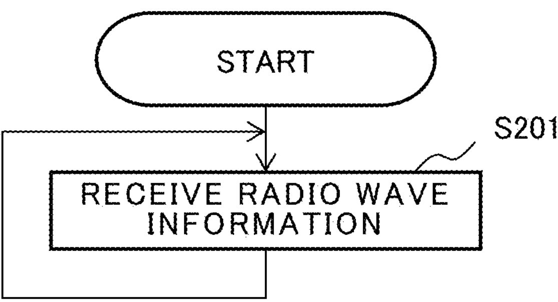
FIG. 6 is a diagram illustrating an example of an operation flow of the information output device according to the second example embodiment of the present invention.
Figure 7:
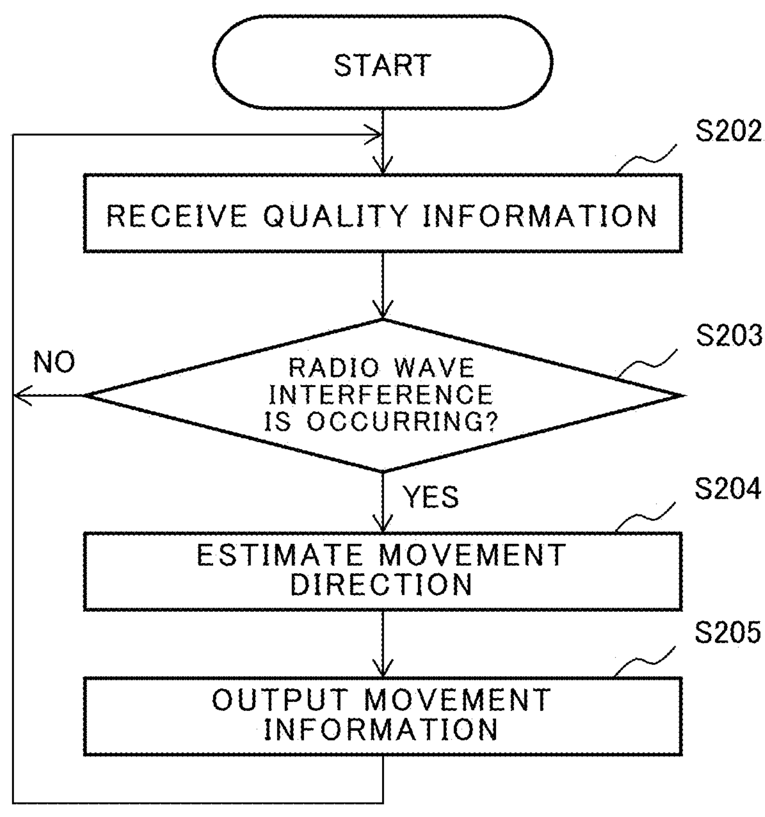
FIG. 7 is a diagram illustrating an example of an operation flow of the information output device according to the second example embodiment of the present invention.

Next, FIGS. 6 and 7 illustrate an example of an operation flow of the information output device 20 according to the present example embodiment.

The information reception unit 21 receives radio wave information. Further, the positional information acquisition unit 24 acquires positional information about the moving object 71. Then, the information reception unit 21 stores the radio wave information received by the information reception unit 21 and the positional information acquired by the positional information acquisition unit 24 in the storage unit in association with each other (step S201 in FIG. 6). The information reception unit 21 receives, from the wireless communication means 40, the radio wave information about a radio wave present around the wireless communication means 40. In the present example embodiment, the information reception unit 21 receives the radio wave information at a predetermined timing. The predetermined timing is, for example, a predetermined time interval and the like.

Further, the information reception unit 21 receives quality information about the wireless communication performed by the wireless communication means 40 (step S202 in FIG. 7). In the present example embodiment, the information reception unit 21 receives the quality information at a predetermined timing. The predetermined timing is, for example, a predetermined time interval and the like. The timing at which the information reception unit 21 receives the radio wave information, and the timing at which the information reception unit 21 receives the quality information may be the same or may be different.

When the information reception unit 21 receives the quality information, the estimation unit 22 estimates, based on the quality information, whether radio wave interference is occurring in the wireless communication performed by the wireless communication means 40 (step S203).

When it is estimated that radio wave interference is occurring (YES in step S203), the estimation unit 22 estimates a movement direction of the wireless communication means 40, based on the radio wave information (step S204). The movement direction is a direction in which an influence of radio wave interference on the wireless communication performed by the wireless communication means 40 is reduced. Note that the estimation unit 22 may perform the estimation of a movement direction when an output of movement information is required instead of when it is estimated that radio wave interference is occurring. In that case, the information output device 20 may not perform step S202 and step S203.

Then, the output unit 23 outputs movement information (step S205). The movement information is information indicating the movement direction.

As described above, in the second example embodiment of the present invention, the information output device 20 includes the information reception unit 21, the estimation unit 22, and the output unit 23. The information reception unit 21 receives radio wave information about a radio wave received by a radio wave reception means for receiving a radio wave present in surroundings. The estimation unit 22 estimates, based on the radio wave information, a movement direction of a wireless communication means for performing wireless communication in which an influence of radio wave interference on the wireless communication is reduced. The output unit 23 outputs movement information. The movement information is information indicating the movement direction. The output unit 23 outputs the movement information to a display means. The display means displays an image. The movement information is image information for displaying the image on the display means. The image is an image in which the movement direction of the wireless communication means is displayed on a map.

In this way, with regard to the wireless communication means for performing the wireless communication, the information output device 20 estimates, based on the radio wave information, the movement direction in which an influence of radio wave interference on the wireless communication is reduced. Then, the information output device 20 outputs the movement information indicating the movement direction to the display means. An image displayed on the display means is an image in which the movement direction of the wireless communication means is displayed on a map. In this way, a user who refers to the image can easily recognize the movement direction of the wireless communication means 40 in which an influence of radio wave interference is reduced. Then, the user can move the wireless communication means 40 in the movement direction in which an influence of radio wave interference is reduced. Thus, information for more easily taking action for radio wave interference can be output.

Further, when the estimation unit 22 estimates that radio wave interference with the wireless communication is occurring, the estimation unit 22 estimates a movement direction. In this way, when it is estimated that radio wave interference is occurring, the information output device 20 can output information about a movement direction in which an influence of radio wave interference is reduced. Then, a user who refers to the movement information can move the wireless communication means 40 (moving object 71), and reduce the influence of radio wave interference.

Further, the estimation unit 22 estimates, as a movement direction, a direction away from an interference source of radio wave interference with the wireless communication, or a direction different from a direction in which the interference source is moving. In this way, a user who refers to the movement information can move the wireless communication means 40 (moving object 71), and reduce an influence of radio wave interference.

Further, the estimation unit 22 estimates a position of an interference source, based on the radio wave information. In this way, the information output device 20 can estimate a movement direction based on the position of the interference source even when information about the position of the interference source is not acquired.

Further, the estimation unit 22 estimates, as a movement direction, a direction approaching a communication partner being a connection destination of the wireless communication. In this way, a user who refers to the movement information can move the wireless communication means 40 (moving object 71), and reduce an influence of radio wave interference.

Further, the estimation unit 22 estimates a departure time being a time until the wireless communication means 40 departs from an area where radio wave interference with the wireless communication may occur. Further, an image includes information about the departure time. In this way, a user who refers to the information about the departure time can recognize the time until the wireless communication means 40 departs from the area where radio wave interference may occur.

Third Example Embodiment

Next, the information output device 30 in the third example embodiment of the present invention is described. Note that one specific example of the information output device 10 in the first example embodiment is the information output device 30 in the third example embodiment.

Figure 8:
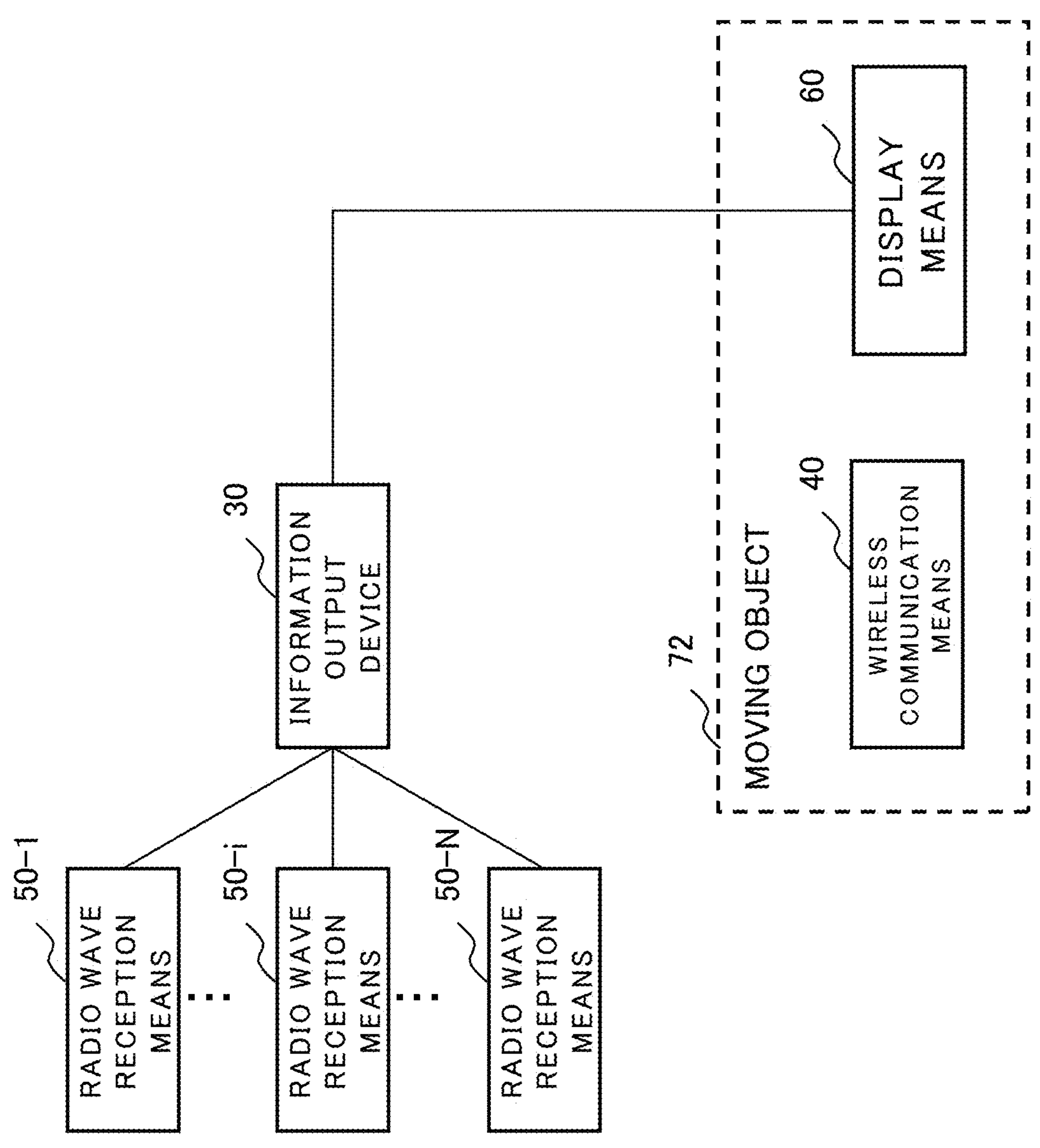
FIG. 8 is a diagram illustrating a configuration example of a system including an information output device according to a third example embodiment of the present invention.

First, FIG. 8 illustrates a configuration example of a system including the information output device 30 according to the present example embodiment. The information output device 30 is connected to the radio wave reception means 50-*i* (i is an integer equal to or more than one and equal to or less than N) with each other. Further, the information output device 30 is connected to a display means 60 with each other. Note that a wireless communication means 40 may be included in the information output device 30.

The wireless communication means 40 and the display means 60 are included in, for example, a moving object 72. The moving object 72 is, for example, an aircraft, a ship, a cellular phone, and the like. Note that the display means 60 may not be included in the moving object 72.

The radio wave reception means 50-*i* receives a radio wave. The radio wave reception means 50-*i* outputs radio wave information about the received radio wave to the information output device 30. The radio wave reception means 50-*i* may be fixedly installed, or may be movable. Further, a communication method for outputting the radio wave information from the radio wave reception means 50-*i* to the information output device 30 may be wired or may be wireless.

The radio wave information includes positional information about the radio wave reception means 50-*i*. When the radio wave reception means 50-*i* is fixedly installed, the radio wave information may not include the positional information about the radio wave reception means 50-*i*. For example, a storage unit (not illustrated) may store, in advance, the positional information about each radio wave reception means 50-*i*, and the information output device 30 may refer to the information stored in the storage unit. Note that the positional information may be two-dimensional information such as a latitude and a longitude, or may be three-dimensional information acquired by adding an altitude to a latitude and a longitude.

The wireless communication means 40 performs wireless communication. The wireless communication means 40 can use any method of wireless communication.

The display means 60 is a man-machine interface such as a display as an output device. The display means 60 displays an image. In the present example embodiment, the information output device 30 outputs movement information to the display means 60. The display means 60 may be mounted on the moving object 72, or may be a display and the like placed at a management center that manages the moving object 72, and the like.

Figure 9:
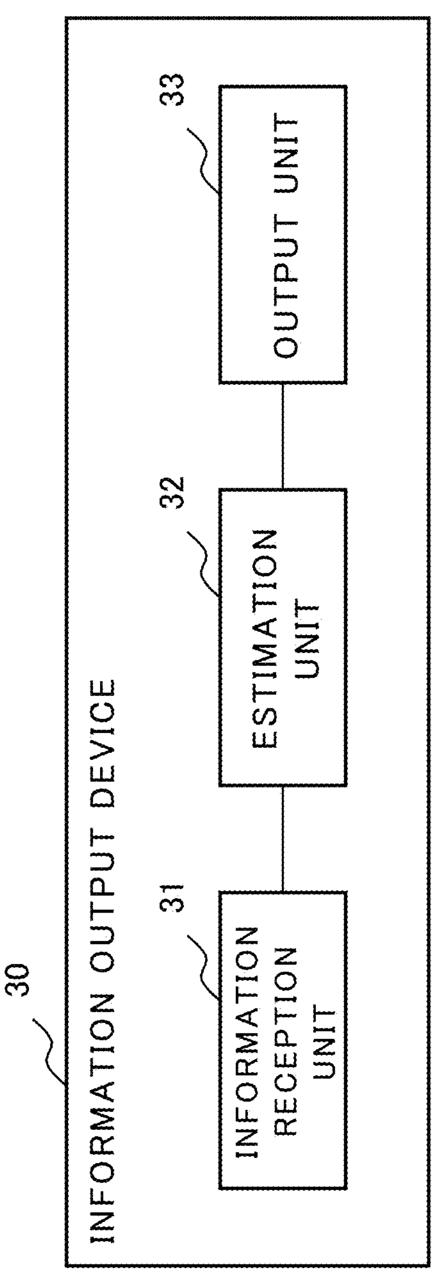
FIG. 9 is a diagram illustrating a configuration example of the information output device according to the third example embodiment of the present invention.

Next, FIG. 9 illustrates the configuration example of the information output device 30 according to the present example embodiment. The information output device 20 according to the present example embodiment includes an information reception unit 31, an estimation unit 32, and an output unit 33.

The information reception unit 31 receives radio wave information. The radio wave information is information about a radio wave received by the radio wave reception means 50-*i*. The information reception unit 31 receives, from the radio wave reception unit 50-*i*, the radio wave information about a radio wave present around the radio wave reception unit 50-*i*.

The estimation unit 32 estimates a movement direction of the wireless communication means 40, based on the radio wave information. The movement direction is a direction in which an influence of radio wave interference on the wireless communication performed by the wireless communication means 40 is reduced. An estimation method of a movement direction is described below.

The output unit 33 outputs movement information. The movement information is information indicating the movement direction. The output unit 33 outputs the movement information to the display means 60. The movement information is image information for displaying an image on the display means 60. The image is an image in which the movement direction of the wireless communication means 40 is displayed on a map. The output unit 33 displays, on the display means 60, the image indicating the movement direction of the wireless communication means 40 by outputting the movement information to the display means 60.

Next, the estimation method of a movement direction is described. The estimation unit 32 may estimate a movement direction by a method similar to that in the second example embodiment. Further, in the present example embodiment, the estimation unit 32 may estimate, as a movement direction, a movement route avoiding an avoidance area, based on the radio wave information received by the information reception unit 31. The avoidance area is an area where passage of the moving object 72 (wireless communication means 40) is desired to be avoided. Hereinafter, an estimation method of a movement route is described.

The avoidance area includes an interference area. The interference area is an area where radio wave interference with the wireless communication performed by the wireless communication means 40 may occur.

First, the estimation unit 32 extracts, from the radio wave information received by the information reception unit 31, radio wave information about a radio wave that may be an interference wave in the wireless communication performed by the wireless communication means 40. The radio wave that may be the interference wave is, for example, a radio wave of a frequency in which radio wave interference with a communication frequency may occur. The communication frequency is a frequency used in the wireless communication performed by the wireless communication means 40. Note that, in this case, the radio wave information includes information about a frequency of the radio wave.

Then, the estimation unit 32 estimates the interference area, based on the extracted radio wave information. For example, with regard to the radio wave having the radio wave information extracted, the estimation unit 32 estimates the interference area, based on a position of the radio wave reception means 50-*i* that receives a radio wave having a signal level exceeding a predetermined level. In this case, information about the position of the radio wave reception means 50-*i* that receives the radio wave, and the signal level of the radio wave are included in the radio wave information. Note that, when the information about the position of the radio wave reception means 50-*i* is stored in a storage unit, the information about the position of the radio wave reception means 50-*i* may not be included in the radio wave information.

For example, the estimation unit 32 may set, as the interference area, a range within a distance according to the signal level from the position of the radio wave reception means 50-*i* that receives the radio wave having the signal level exceeding the predetermined level. The distance according to the signal level increases as the signal level increases.

Further, for example, the estimation unit 32 may estimate, based on the extracted radio wave information, a position of a transmission source of the radio wave having the radio wave information extracted, and may set, as the interference area, a range within a predetermined distance from the position of the transmission source. The estimation unit 32 can use any method as an estimation method of a position of a transmission source. In this case, the radio wave information includes information that can be used for determining the position of the transmission source. Further, the estimation unit 32 may estimate an area having a signal level exceeding a predetermined level as the interference area, based on the position of the transmission source and the radio wave information.

Then, the estimation unit 32 estimates, as a movement direction, a movement route avoiding the avoidance area estimated as described above. For example, the estimation unit 32 searches for a route from an origin to a destination, based on information about the origin and the destination. The estimation unit 32 can use a search method and a search condition of a general route for searching for a route. For example, the estimation unit 32 can search for a route, based on a general search condition such as a condition that a passage prohibition region (such as a region that is not a course) is not passed. Further, a search condition unique to the moving object 72 such as a condition that a route of another ship is not blocked may be included in a search condition of a route.

Then, the estimation unit 32 estimates, as the movement direction, the route on which the avoidance area is not passed among the searched routes. Note that the estimation unit 32 may estimate two or more routes as the movement direction. Further, when the route on which the avoidance area is not passed is not searched, the estimation unit 32 may estimate, as the movement direction, a route having a shorter distance in which the avoidance area is passed, or a route on which a portion passing through the avoidance area is closer to an outer edge of the avoidance area.

Further, the avoidance area may further include an interception area. The interception area is an area with a possibility that the wireless communication performed by the wireless communication means 40 may be intercepted. A target by which the wireless communication performed by the wireless communication means 40 is not desired to be intercepted is, for example, a reception device that is not a reception device of a group to which the wireless communication means 40 belongs.

For example, the estimation unit 32 estimates an interception area as follows. First, the estimation unit 32 extracts, from the radio wave information received by the information reception unit 31, radio wave information about a radio wave different from a radio wave used in the group to which the wireless communication means 40 belongs. The estimation unit 32 determines whether the radio wave is used in the group from, for example, identification information about the radio wave, a modulation method, waveform data, and the like.

Next, the estimation unit 32 estimates a position of a transmission source of the radio wave, based on the extracted radio wave information. Then, the estimation unit 32 estimates a range within a predetermined distance from the position of the transmission source as the interception area. The estimation method of an interception area is based on an assumption that a reception device being a target by which the wireless communication performed by the wireless communication means 40 is not desired to be intercepted is present in the position of the transmission source. Further, the predetermined distance is, for example, a distance in which the wireless communication means 40 can receive a signal. This is based on an assumption that performance of the reception device being the target by which the wireless communication performed by the wireless communication means 40 is not desired to be intercepted is similar to that of the wireless communication means 40.

Next, a specific example of an image displayed on the display means 60 by the output unit 33 is described.

The image may be an image in which information about a movement direction estimated by the estimation unit 32 is displayed on a map. The image may be an image similar to that in the second example embodiment.

Further, when a movement direction is a movement route, the image may be an image in which information about the movement route is displayed on a map. Further, when the estimation unit 32 estimates an interference area, the image may include a screen item indicating the interference area. Further, when the estimation unit 32 estimates an interception area, the image may include a screen item indicating the interception area.

Figure 10:
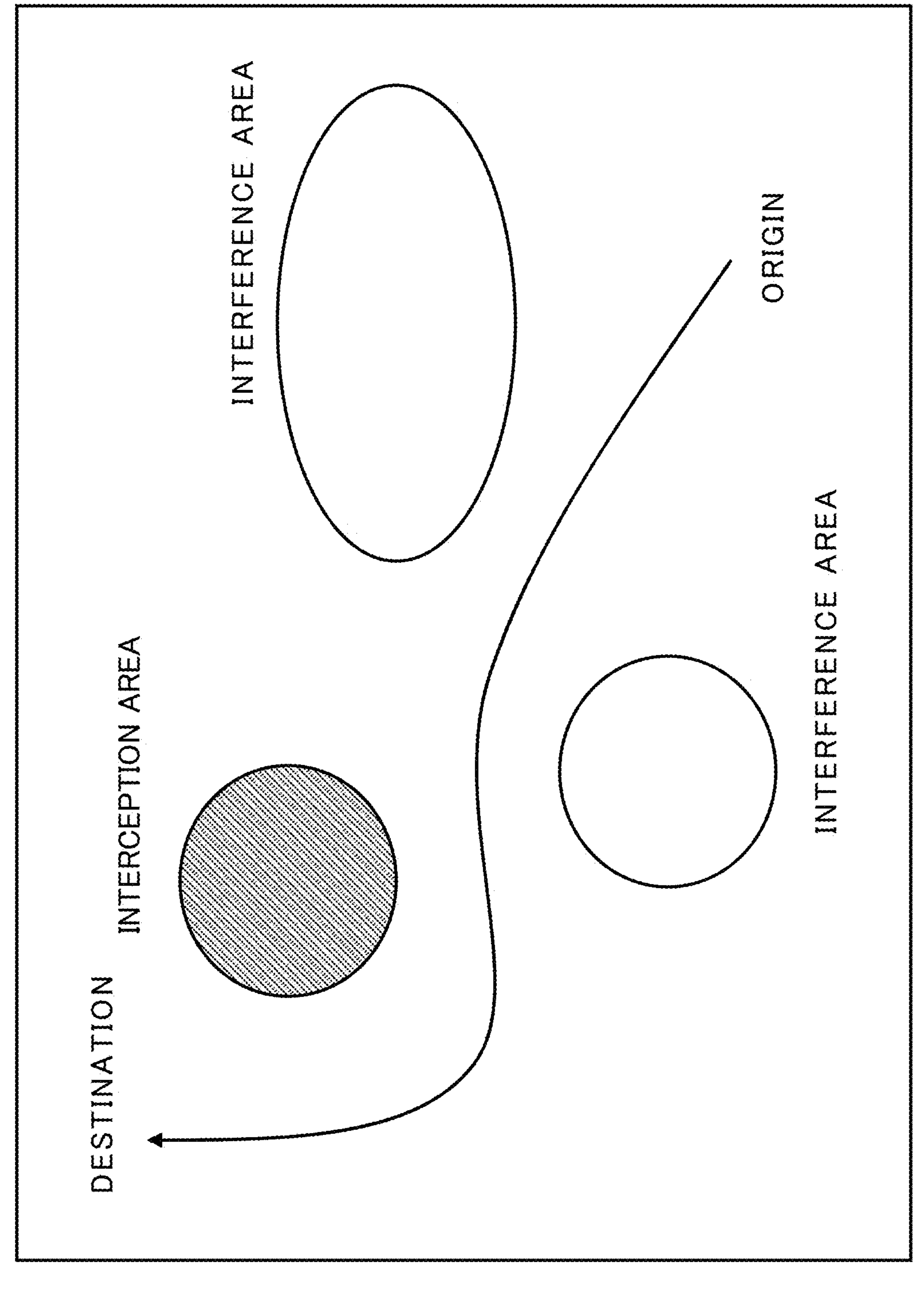
FIG. 10 is a diagram of an image displayed on a display means by the information output device according to the third example embodiment of the present invention.

FIG. 10 is a diagram illustrating an example of an image displayed on the display means 60. In the example in FIG. 10, a movement route of the wireless communication means 40 is displayed on a map by an arrow. Further, an interference area is displayed. Further, an interception area is displayed.

Figure 11:
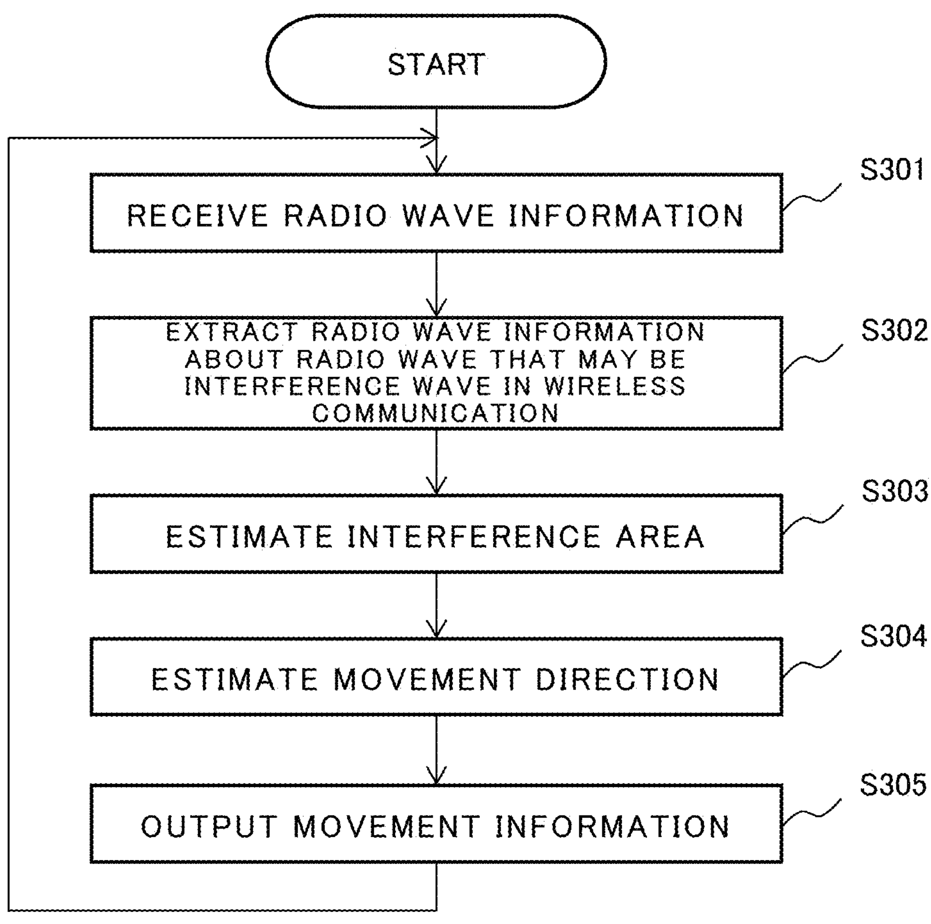
FIG. 11 is a diagram illustrating an example of an operation flow of the information output device according to the third example embodiment of the present invention.

Next, FIG. 11 illustrates an example of an operation flow of the information output device 30 according to the present example embodiment.

The information reception unit 31 receives radio wave information (step S301). The information reception unit 31 receives, from the radio wave reception unit 50-*i*, the radio wave information about a radio wave present around the radio wave reception unit 50-*i*. In the present example embodiment, the information reception unit 31 receives the radio wave information at a predetermined timing. The predetermined timing is, for example, a predetermined time interval, a case where an output of movement information is required, and the like.

Next, the estimation unit 32 extracts, from the radio wave information received by the information reception unit 31, radio wave information about a radio wave that may be an interference wave in the wireless communication performed by the wireless communication means 40 (step S302). Next, the estimation unit 32 estimates an interference area, based on the extracted radio wave information (step S303).

Next, the estimation unit 32 estimates a movement direction of the wireless communication means 40 (moving object 72), based on the radio wave information (step S304). The movement direction is a direction in which an influence of radio wave interference on the wireless communication performed by the wireless communication means 40 is reduced. The movement direction may be a movement route.

Then, the output unit 33 outputs movement information (step S305). The movement information is information indicating the movement direction.

As described above, in the third example embodiment of the present invention, the information output device 30 includes the information reception unit 31, the estimation unit 32, and the output unit 33. The information reception unit 31 receives radio wave information about a radio wave received by a radio wave reception means for receiving a radio wave present in surroundings. The estimation unit 32 estimates, based on the radio wave information, a movement direction of a wireless communication means for performing wireless communication in which an influence of radio wave interference on the wireless communication is reduced. The output unit 33 outputs movement information. The movement information is information indicating the movement direction. The output unit 33 outputs the movement information to a display means. The display means displays an image. The movement information is image information for displaying the image on the display means. The image is an image in which the movement direction of the wireless communication means is displayed on a map.

In this way, with regard to the wireless communication means for performing the wireless communication, the information output device 30 estimates, based on the radio wave information, the movement direction in which an influence of radio wave interference on the wireless communication is reduced. Then, the information output device 30 outputs the movement information indicating the movement direction to the display means. An image displayed on the display means is an image in which the movement direction of the wireless communication means is displayed on a map. In this way, a user who refers to the image can easily recognize the movement direction of the wireless communication means 40 in which an influence of radio wave interference is reduced. Then, the user can move the wireless communication means 40 in the movement direction in which an influence of radio wave interference is reduced. Thus, information for more easily taking action for radio wave interference can be output.

Further, the estimation unit 32 estimates, based on the radio wave information, an interference area being an area with a possibility that radio wave interference with the wireless communication may occur, and estimates, as the movement direction, a movement route avoiding an avoidance area. Further, the avoidance area includes the interference area. In this way, a user who refers to the image can move the wireless communication means 40 while avoiding an influence of radio wave interference.

Further, the estimation unit 32 estimates, based on the radio wave information, an interception area being an area with a possibility that the wireless communication may be intercepted. The avoidance area further includes the interception area. In this way, a user who refers to the image can move the wireless communication means 40 while avoiding the interception area.

Further, the estimation unit 32 estimates, as the movement direction, a route on which the avoidance area is not passed among routes from an origin to a destination. Further, when there is no route on which the avoidance area is not passed, the estimation unit 32 estimates, as the movement direction, a route having a shorter distance in which the avoidance area is passed, or a route on which a portion passing through the avoidance area is closer to an outer edge of the avoidance area. In this way, a user who refers to the image can move the wireless communication means 40 in such a way as to reduce an influence of radio wave interference and a possibility of interception of the wireless communication as much as possible.

[Hardware Configuration Example]

A configuration example of a hardware source that achieves the information output device (10, 20, 30) according to each of the example embodiments of the present invention described above by using one information processing device (computer) is described. Note that the information output device may be achieved by physically or functionally using at least two information processing devices. Further, the information output device may be achieved as a dedicated device. Further, only a part of a function of the information output device may be achieved by using the information processing device.

Figure 12:
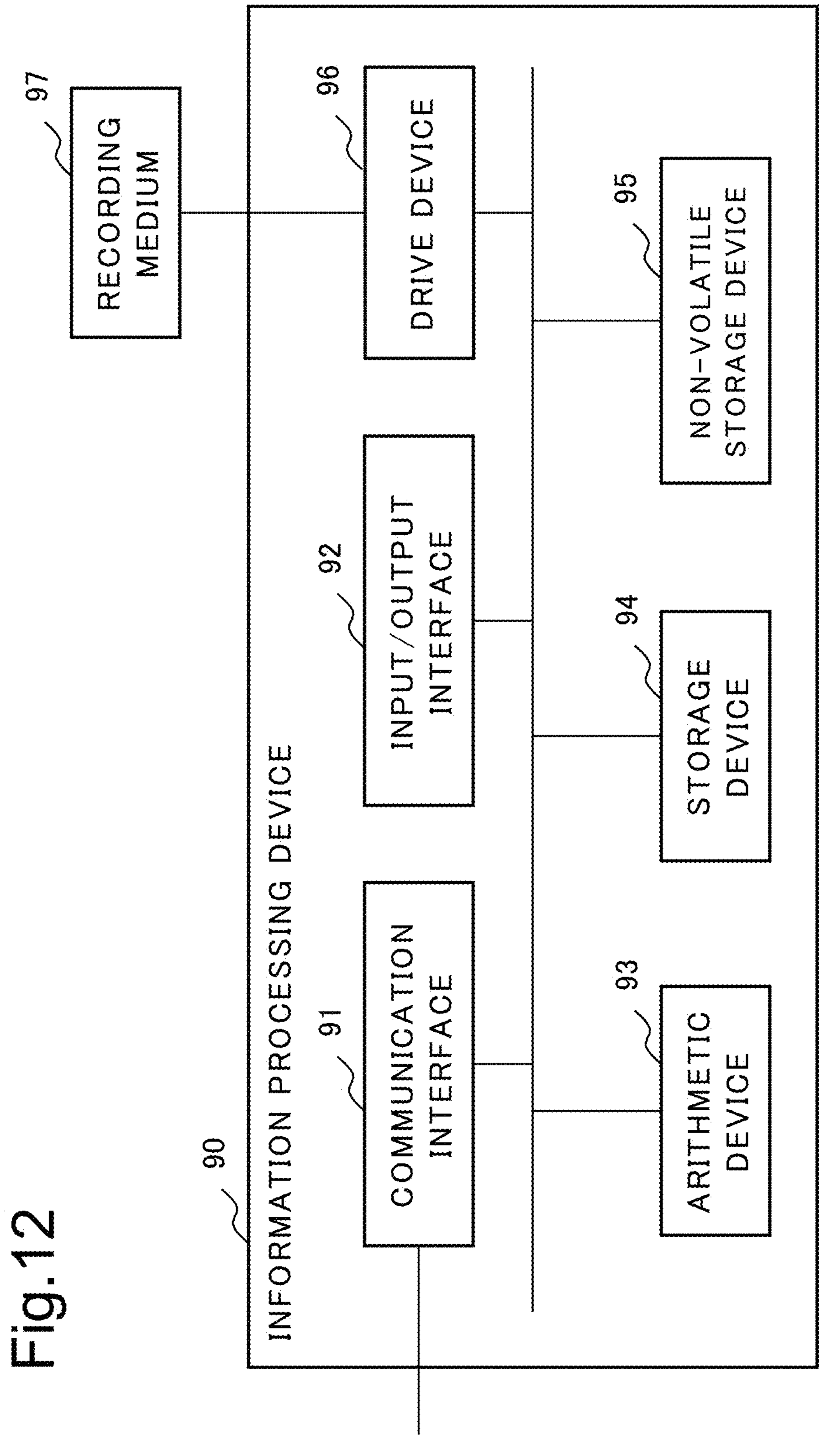
FIG. 12 is a diagram illustrating a hardware configuration example of each of the example embodiments of the present invention.

FIG. 12 is a diagram schematically illustrating a hardware configuration example of an information processing device that can achieve the information output device according to each of the example embodiments of the present invention. An information processing device 90 includes a communication interface 91, an input/output interface 92, an arithmetic device 93, a storage device 94, a non-volatile storage device 95, and a drive device 96.

For example, the information reception unit 11 and the output unit 13 in FIG. 1 can be achieved by the communication interface 91 and the arithmetic device. The estimation unit 12 can be achieved by the arithmetic device 93.

The communication interface 91 is a communication means for allowing the information output device according to each of the example embodiments to communicate with an external device in a wired and/or wireless manner. Note that, when the information output device is achieved by using at least two information processing devices, the information output device may be connected in such a way as to perform communication between the information processing devices with each other via the communication interface 91.

The input/output interface 92 is a man-machine interface such as a keyboard being one example of an input device and a display as an output device.

The arithmetic device 93 is achieved by an arithmetic processing device, such as a general-purpose central processing unit (CPU) and a microprocessor, and a plurality of electric circuits. For example, the arithmetic device 93 can read, in the storage device 94, various types of programs stored in the non-volatile storage device 95, and execute processing according to the read program.

The storage device 94 is a memory device, such as a random access memory (RAM), that can be referred from the arithmetic device 93, and stores a program, various types of data, and the like. The storage device 94 may be a volatile memory device.

The non-volatile storage device 95 is a non-volatile storage device such as a read only memory (ROM) and a flash memory, for example, and can store various types of programs, data, and the like.

For example, the drive device 96 is a device that processes reading and writing of data from and to a recording medium 97 described below.

The recording medium 97 is any recording medium that can record data, such as an optical disk, a magneto-optical disk, and a semiconductor flash memory, for example.

According to each of the example embodiments of the present invention, for example, the information output device is constituted of the information processing device 90 illustrated in FIG. 12, and the information output device may be achieved by supplying, to the information output device, a program that can achieve a function described in each of the above-described example embodiments.

In this case, the example embodiment can be achieved by the arithmetic device 93 executing the program supplied to the information output device. Further, a part of a function instead of the entire information output device can also be constituted of the information processing device 90.

Furthermore, the above-described program may be recorded in the recording medium 97, and the information output device may be constituted in such a way that the above-described program is appropriately stored in the non-volatile storage device 95 at a shipment stage, an operation stage, or the like of the information output device. Note that, in this case, as a method for supplying the above-described program, a method for installing the above-described program inside the information output device by using an appropriate jig at a manufacturing stage before shipment, an operation stage, or the like may be adopted. Further, as the method for supplying the above-described program, a general procedure of a method for downloading from the outside via a communication line such as the Internet and the like may be adopted.

The whole or part of the example embodiments disclosed above can be described as, but not limited to, the following supplementary notes.

Supplementary Note 1

An information output device comprising:

an information reception means for receiving radio wave information about a radio wave present in surroundings being received by a radio wave reception means for receiving the radio wave;

an estimation means for estimating, based on the radio wave information, a movement direction of a wireless communication means for performing wireless communication in which an influence of radio wave interference on the wireless communication is reduced; and an output means for outputting movement information being information indicating the movement direction, wherein the output means outputs the movement information to a display means for displaying an image, the movement information is image information for displaying the image on the display means, and the image is an image in which the movement direction of the wireless communication means is displayed on a map.

Supplementary Note 2

The information output device according to supplementary note 1, wherein, when the estimation means estimates that radio wave interference with the wireless communication is occurring, the estimation means estimates the movement direction.

Supplementary Note 3

The information output device according to supplementary note 1 or 2, wherein the radio wave information includes information about a position of an interference source of radio wave interference with the wireless communication, and the estimation means estimates, as the movement direction, a direction away from the interference source, or a direction different from a direction in which the interference source is moving.

Supplementary Note 4

The information output device according to supplementary note 3, wherein the estimation means estimates a position of the interference source, based on the radio wave information.

Supplementary Note 5

The information output device according to supplementary note 1 or 2, wherein the estimation means estimates, as the movement direction, a direction approaching a communication partner being a connection destination of the wireless communication.

Supplementary Note 6

The information output device according to any one of supplementary notes 1 to 5, wherein the estimation means estimates a departure time being a time until the wireless communication means departs from an area where radio wave interference with the wireless communication may occur, and the image includes information about the departure time.

Supplementary Note 7

The information output device according to supplementary note 1, wherein the estimation means estimates, based on the radio wave information, an interference area being an area with a possibility that radio wave interference with the wireless communication may occur, and estimates, as the movement direction, a movement route avoiding an avoidance area, and the avoidance area is an area where passage of the wireless communication means is desired to be avoided, and includes the interference area.

Supplementary Note 8

The information output device according to supplementary note 7, wherein the estimation means estimates, based on the radio wave information, an interception area being an area with a possibility that the wireless communication may be intercepted, and the avoidance area further includes an interception area.

Supplementary Note 9

The information output device according to supplementary note 7 or 8, wherein the estimation means estimates, as the movement direction, a route on which the avoidance area is not passed among routes from an origin to a destination.

Supplementary Note 10

The information output device according to supplementary note 9, wherein, when there is no route on which the avoidance area is not passed, the estimation means estimates, as the movement direction, a route having a shorter distance in which the avoidance area is passed, or a route on which a portion passing through the avoidance area is closer to an outer edge of the avoidance area.

Supplementary Note 11

The information output device according to any one of supplementary notes 1 to 10, wherein the wireless communication means also functions as the radio wave reception means.

Supplementary Note 12

An information output method comprising:

receiving radio wave information about a radio wave present in surroundings being received by a radio wave reception means for receiving the radio wave;

estimating, based on the radio wave information, a movement direction of a wireless communication means for performing wireless communication in which an influence of radio wave interference on the wireless communication is reduced;

outputting movement information being information indicating the movement direction; and outputting the movement information to a display means for displaying an image, wherein the movement information is image information for displaying the image on the display means, and the image is an image in which the movement direction of the wireless communication means is displayed on a map.

Supplementary Note 13

The information output method according to supplementary note 12, wherein when it is estimated that radio wave interference on the wireless communication is occurring, the movement direction is estimated.

Supplementary Note 14

The information output method according to supplementary note 12 or 13, wherein the radio wave information includes information about a position of an interference source of radio wave interference with the wireless communication, and a direction away from the interference source, or a direction different from a direction in which the interference source is moving is estimated as the movement direction.

Supplementary Note 15

The information output method according to supplementary note 14, wherein a position of the interference source is estimated, based on the radio wave information.

Supplementary Note 16

The information output method according to supplementary note 12 or 13, wherein a direction approaching a communication partner being a connection destination of the wireless communication is estimated as the movement direction.

Supplementary Note 17

The information output method according to any one of supplementary notes 12 to 16, further comprising estimating a departure time being a time until the wireless communication means departs from an area where radio wave interference with the wireless communication may occur, wherein the image includes information about the departure time.

Supplementary Note 18

The information output method according to supplementary note 12, further comprising:

estimating, based on the radio wave information, an interference area being an area with a possibility that radio wave interference with the wireless communication may occur, wherein a movement route avoiding an avoidance area is estimated as the movement direction, and the avoidance area is an area where passage of the wireless communication means is desired to be avoided, and includes the interference area.

Supplementary Note 19

The information output method according to supplementary note 18, further comprising estimating, based on the radio wave information, an interception area being an area with a possibility that the wireless communication may be intercepted, wherein the avoidance area further includes an interception area.

Supplementary Note 20

The information output method according to supplementary note 18 or 19, wherein a route on which the avoidance area is not passed among routes from an origin to a destination is estimated as the movement direction.

Supplementary Note 21

The information output method according to supplementary note 20, wherein when there is no route on which the avoidance area is not passed, a route having a shorter distance in which the avoidance area is passed, or a route on which a portion passing through the avoidance area is closer to an outer edge of the avoidance area is estimated as the movement direction.

Supplementary Note 22

The information output method according to any one of supplementary notes 12 to 21, wherein the wireless communication means also functions as the radio wave reception means.

Supplementary Note 23

A computer-readable recording medium recording an information output program causing a computer to achieve:

an information reception function of receiving radio wave information about a radio wave present in surroundings being received by a radio wave reception means for receiving the radio wave;

an estimation function of estimating, based on the radio wave information, a movement direction of a wireless communication means for performing wireless communication in which an influence of radio wave interference on the wireless communication is reduced; and an output function of outputting movement information being information indicating the movement direction, wherein the output function outputs the movement information to a display means for displaying an image, the movement information is image information for displaying the image on the display means, and the image is an image in which the movement direction of the wireless communication means is displayed on a map.

Supplementary Note 24

The computer-readable recording medium recording an information output program according to supplementary note 23, wherein, when the estimation function estimates that radio wave interference with the wireless communication is occurring, the estimation function estimates the movement direction.

Supplementary Note 25

The computer-readable recording medium recording an information output program according to supplementary note 23 or 24, wherein the radio wave information includes information about a position of an interference source of radio wave interference with the wireless communication, and the estimation function estimates, as the movement direction, a direction away from the interference source, or a direction different from a direction in which the interference source is moving.

Supplementary Note 26

The computer-readable recording medium recording an information output program according to supplementary note 25, wherein the estimation function estimates a position of the interference source, based on the radio wave information.

Supplementary Note 27

The computer-readable recording medium recording an information output program according to supplementary note 23 or 24, wherein the estimation function estimates, as the movement direction, a direction approaching a communication partner being a connection destination of the wireless communication.

Supplementary Note 28

The computer-readable recording medium recording an information output program according to any one of supplementary notes 23 to 27, wherein the estimation function estimates a departure time being a time until the wireless communication means departs from an area where radio wave interference with the wireless communication may occur, and the image includes information about the departure time.

Supplementary Note 29

The computer-readable recording medium recording an information output program according to supplementary note 23, wherein the estimation function estimates, based on the radio wave information, an interference area being an area with a possibility that radio wave interference with the wireless communication may occur, and estimates, as the movement direction, a movement route avoiding an avoidance area, and the avoidance area is an area where passage of the wireless communication means is desired to be avoided, and includes the interference area.

Supplementary Note 30

The computer-readable recording medium recording an information output program according to supplementary note 29, wherein the estimation function estimates, based on the radio wave information, an interception area being an area with a possibility that the wireless communication may be intercepted, and the avoidance area further includes an interception area.

Supplementary Note 31

The computer-readable recording medium recording an information output program according to supplementary note 29 or 30, wherein the estimation function estimates, as the movement direction, a route on which the avoidance area is not passed among routes from an origin to a destination.

Supplementary Note 32

The computer-readable recording medium recording an information output program according to supplementary note 31, wherein, when there is no route on which the avoidance area is not passed, the estimation function estimates, as the movement direction, a route having a shorter distance in which the avoidance area is passed, or a route on which a portion passing through the avoidance area is closer to an outer edge of the avoidance area.

Supplementary Note 33

The computer-readable recording medium recording an information output program according to any one of supplementary notes 23 to 32, wherein the wireless communication means also functions as the radio wave reception means.

Supplementary Note 34

An information output system comprising:

an information reception means for receiving radio wave information about a radio wave present in surroundings being received by a radio wave reception means for receiving the radio wave;

an estimation means for estimating, based on the radio wave information, a movement direction of a wireless communication means for performing wireless communication in which an influence of radio wave interference on the wireless communication is reduced; and an output means for outputting movement information being information indicating the movement direction, wherein the output means outputs the movement information to a display means for displaying an image, the movement information is image information for displaying the image on the display means, and the image is an image in which the movement direction of the wireless communication means is displayed on a map.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10, 20, 30 Information output device
11, 21, 31 Information reception unit
12, 22, 32 Estimation unit
13, 23, 33 Output unit
24 Position information acquisition unit
40 Wireless communication means
50-*i* Radio wave reception means
60 Display means
71, 72 Moving object
90 Information processing device
91 Communication interface
92 Input/output interface
93 Arithmetic device
94 Storage device
95 Non-volatile storage device
96 Drive device
97 Recording medium

What is claimed is:

1. An information output device comprising one or more memories storing instructions and one or more processors configured to execute the instructions to:

receive radio wave information about a radio wave present in surroundings being received by a radio wave receiver;

estimate, based on the radio wave information, a movement direction of a wireless communication device performing wireless communication in which an influence of radio wave interference on the wireless communication is reduced; and output movement information indicating the movement direction, wherein the movement information is output to a display, the movement information is displayed as an image on the display, the image depicts the movement direction of the wireless communication device on a map, the processors are configured to execute the instructions to estimate a departure time indicating a time period until the wireless communication device departs from an area where radio wave interference with the wireless communication may occur by moving in the movement direction, the image includes information about the departure time.

2. The information output device according to claim 1, wherein, when it is estimated that radio wave interference with the wireless communication is occurring, the movement direction is estimated.

3. The information output device according to claim 1, wherein the radio wave information includes information about a position of an interference source of radio wave interference with the wireless communication, and a direction away from the interference source, or a direction different from a direction in which the interference source is moving is estimated as the movement direction.

4. The information output device according to claim 3, wherein a position of the interference source is estimated, based on the radio wave information.

5. The information output device according to claim 1, wherein a direction approaching a communication partner being a connection destination of the wireless communication is estimated as the movement direction.

6. The information output device according to claim 1, wherein the processors are configured to execute the instructions to estimate, based on the radio wave information, an interference area being an area with a possibility that radio wave interference with the wireless communication may occur, a movement route avoiding an avoidance area is estimated as the movement direction, and the avoidance area is an area where passage of the wireless communication means is desired to be avoided, and includes the interference area.

7. The information output device according to claim 6, wherein the processors are configured to execute the instructions to estimate, based on the radio wave information, an interception area being an area with a possibility that the wireless communication may be intercepted, and the avoidance area further includes an interception area.

8. The information output device according to claim 6, wherein a route on which the avoidance area is not passed among routes from an origin to a destination is estimated as the movement direction.

9. The information output device according to claim 8, wherein, when there is no route on which the avoidance area is not passed, a route having a shorter distance in which the avoidance area is passed, or a route on which a portion passing through the avoidance area is closer to an outer edge of the avoidance area is estimated as the movement direction.

10. The information output device according to claim 1, wherein the wireless communication device also functions as the radio wave receiver.

11. An information output method comprising:

receiving radio wave information about a radio wave present in surroundings being received by a radio wave receiver;

estimating, based on the radio wave information, a movement direction of a wireless communication device performing wireless communication in which an influence of radio wave interference on the wireless communication is reduced;

estimating a departure time indicating a time period until the wireless communication device departs from an area where radio wave interference with the wireless communication may occur by moving in the movement direction;

outputting movement information indicating the movement direction; and outputting the movement information to a display, wherein the movement information is displayed as an image on the display, the image depicts the movement direction of the wireless communication device on a map, and the image includes information about the departure time.

12. The information output method according to claim 11, wherein when it is estimated that radio wave interference on the wireless communication is occurring, the movement direction is estimated.

13. The information output method according to claim 11, wherein the radio wave information includes information about a position of an interference source of radio wave interference with the wireless communication, and a direction away from the interference source, or a direction different from a direction in which the interference source is moving is estimated as the movement direction.

14. The information output method according to claim 13, wherein a position of the interference source is estimated, based on the radio wave information.

15. The information output method according to claim 11, wherein a direction approaching a communication partner being a connection destination of the wireless communication is estimated as the movement direction.

16. The information output method according to claim 11, further comprising:

estimating, based on the radio wave information, an interference area being an area with a possibility that radio wave interference with the wireless communication may occur, wherein a movement route avoiding an avoidance area is estimated as the movement direction, and the avoidance area is an area where passage of the wireless communication device is desired to be avoided, and includes the interference area.

17. The information output method according to claim 16, further comprising estimating, based on the radio wave information, an interception area being an area with a possibility that the wireless communication may be intercepted, wherein the avoidance area further includes an interception area.

18. A non-transitory computer-readable recording medium recording an information output program causing a computer to achieve:

an information reception function of receiving radio wave information about a radio wave present in surroundings being received by a radio wave receiver;

an estimation function of estimating, based on the radio wave information, a movement direction of a wireless communication device performing wireless communication in which an influence of radio wave interference on the wireless communication is reduced; and an output function of outputting movement information indicating the movement direction, wherein the output function outputs the movement information to a display, the movement information is displayed as an image on the display, the image depicts the movement direction of the wireless communication device on a map, the estimation function estimates a departure time indicating a time period until the wireless communication device departs from an area where radio wave interference with the wireless communication may occur by moving in the movement direction, and the image includes information about the departure time.

* * * * *